United States Patent [19]

Watson

[11] Patent Number: 4,674,331

[45] Date of Patent: Jun. 23, 1987

[54] ANGULAR RATE SENSOR

[75] Inventor: William S. Watson, Eau Claire, Wis.

[73] Assignee: Watson Industries Inc., Eau Claire, Wis.

[21] Appl. No.: 926,878

[22] Filed: Nov. 5, 1986

Related U.S. Application Data

[63] Continuation of Ser. No. 635,116, Jul. 27, 1984, abandoned.

[51] Int. Cl.$^4$ .............................................. G01P 9/04
[52] U.S. Cl. ..................................................... 73/505
[58] Field of Search ........................ 73/505, 518, 519

[56] References Cited

U.S. PATENT DOCUMENTS 2,455,939 12/1948 Meredith ................ 73/505
2,513,340 7/1950 Lyman .
2,544,646 3/1951 Barnaby et al. ......... 73/505
2,974,530 5/1958 Jaouen .
3,839,915 10/1974 Schlitt .................. 73/505

FOREIGN PATENT DOCUMENTS 84704 8/1983 European Pat. Off. ........ 73/505

Primary Examiner—Jerry W. Myracle
Assistant Examiner—John E. Chapman, Jr.

Attorney, Agent, or Firm—Merchant, Gould, Smith, Edell, Welter & Schmidt

[57] ABSTRACT

Angular rate sensors are disclosed. Each sensor includes a forked vibrating element having two tines extending from a base end to a free end. Each of the tines are magnetized to have two regions of opposing magnetic polarity, with the polarity of corresponding regions between the different tines being opposite. In a first embodiment, the tines are driven in complementary resonant vibration by a pair of drive coils positioned about the tines near the free ends thereof. In a second embodiment, the drive coils are located about the tines at the junction of the regions of magnetization mid-element. In the first embodiment, sense motions are detected by a pair of sense coils positioned about mid-element near the junction of the first and second regions of magnetization. In the second embodiment, sense motions are detected by capacitive sensing, which consists of two parallel plate capacitors formed of the tines and additional plates, which are connected for differential sensing. Each of the tines is configured to have a first natural frequency of resonance in the drive plane and a second natural frequency of resonance for sense motions, with the second frequency being greater than the first, in order to extend the usable bandwidth of operation of the sensor.

23 Claims, 17 Drawing Figures

ANGULAR RATE SENSOR

This is a continuation of application Ser. No. 635,116 filed July 27, 1984, now abandoned.

TECHNICAL FIELD OF THE INVENTION

The present invention relates to the field of angular rate sensors, and more particularly to vibrating element sensors.

BACKGROUND OF THE INVENTION

The theoretical basis for present day angular rate sensing was developed at least as early as 1850, when the French physicist, Jean Bernard Foucault, conducted a detailed investigation of the principles of conservation of momentum. In one experiment, he used a gyroscope to demonstrate the rotation of the earth. In another experiment, he discovered that the plane of transverse oscillation of a thin, vibrating rod clamped in the chuck of a lathe tends to remain fixed in space independent of the rotation of the chuck. Although these experiments clearly demonstrated the theoretical possibility for angular rate sensors, it was not until the early 20th century and the advent of instrument airplane flight that the necessity of developing a practical rate sensor was recognized.

Although from a theoretical standpoint the principles of conservation of momentum could be employed to produce an angular rate sensor using either a gyroscope or a vibrating element, gyroscopes proved to be much simpler to implement. Thus, the rate gyroscope naturally became the first commercially available type of angular rate sensor. However, even though it has been continually refined over the decades the rate gyro has several inherent limitations which can never be completely overcome. These include the sensing errors introduced by wear on the bearings which are essential to gyroscopic devices, and relatively high power consumption.

In response to the disadvantages of the rate gyro, many different types of vibrating element sensors have been developed, including vibrating wire, vibrating beam and vibrating rod sensors. Vibrating wire and beam sensors must be supported on both ends, and thus are particularly susceptible to sensing errors caused by thermal expansion and contraction, which have been found quite difficult to accommodate or compensate for. The vibrating rod sensor comprises at least one elongate vibrating element, of circular or rectangular cross section, which is fixed at one end to a mounting base and free on the other end. The rod is driven for vibration, typically at its resonant frequency, in a "drive" or "guide" plane such that under zero angular rotation conditions, the rod ideally has no component of motion normal or transverse to the drive plane. Typically, the element is constrained under zero angular rate conditions to movement in the drive plane by electromagnetic forces, mechancal configuration, material properties of the vibrating element, or a combination thereof. Thus, when the rod is rotated about its longitudinal or "sense" axis, the angular rate of turn may be detected by sensing the deflection of the rod out of the drive plane, or in other words the component of motion of the rod which is induced transverse to the drive plane, as caused by Coriolis forces. This transverse or "sense" motion is typically measured using piezoelectric bender elements which may be connected, or attached, or integral with the vibrating rod, or using electromagnetic elements such as magnetic forces and coils.

One important aspect of vibrating rod sensors concerns the vibrating characteristics of the rod. The natural resonant frequencies of the rod must be considered both for the purpose of controlling the frequency of vibration in the drive plane and for the purpose of providing predictable and measurable sense responses. The two resonant frequencies of concern are the drive plane resonant frequency and the sense motion resonant frequency. The peak of the sense response is at the resonant frequency of sense motions. Because energy from the drive plane which is converted to sense motion by angular rotations of the sensor is transferred at the drive resonance frequency, the best signal gain may be obtained by matching the drive and sense resonant frequency characteristics of the element. Thus, such a design has been adopted for many prior art devices. For instance, U.S. Pat. No. 2,513,340 to Lyman, U.S. Pat. No. 2,544,646 to Barnaby et al and U.S. Pat. No. 2,974,530 to Jaouen all teach that it is preferable that the drive and sense resonant frequencies be equal. There are, however, as will be demonstrated below in the ensuing specification, inherent difficulties and limitations in systems adopting this approach.

In addition to considerations relating to the resonant frequency characteristics, there are other aspects of vibrating rod sensor design which have a critical influence on the practical usefulness of such sensors. For instance, a sensor must be designed so that external shock vibration or the like do not cause undue extraneous and erroneous angular rate signals to be developed. Similarly, vibrating rod sensors must be designed such that vibrations from the drive plane are not transferred by acoustic or sonic energy propagation into sense motion, which also has the result of producing erroneous angular rate signals. Furthermore, in the case of wholly electromagnetic devices, i.e., devices that employ electromagnetics to both drive the element and to sense the rate of turn, cross coupling between the drive and sense coils must be accomodated or compensated for. Moreover, electromagnetic devices must also accommodate the effects of externally generated magnetic fields such as the earth's magnetic field.

There are other significant design barriers which must be overcome in order to provide a vibrating rod sensor that may be utilized over a wide range of temperatures, or in high shock environments. with regard to the former, materials and designs must have a low sensitivity to variation in temperature, both in terms of physical expansion and contraction of the components and in terms of the electromagnetic or electrical characteristics of the materials. Moreover, with regard to the latter, the materials must be selected to survive high G forces as are often found in military applications and in some commercial applications as well. Moreover, as is often necessary for military applications, a sensor may have to have a short warm-up time such that warm-up transients do not initially produce erroneous rate of turn measurements.

As will be seen from the ensuing specification, the present invention deals with each and every one of the above-mentioned design obstacles to provide a practical form of a vibrating rod sensor which is capable of performing up to exacting military standards or in less demanding commercial environments.

SUMMARY OF THE INVENTION

According to one aspect of the present invention there is provided an angular rate sensor including a forked vibrating element having a mounting end and a pair of elongate tines extending therefrom to a free end of the element with the mounting end of the element forming a nodal axis of vibrational energy for the tines. The mounting end of the element is rigidly mounted to a base member which forms one end of a cylindrical shell housing around the vibrating element.

Each of the tines is magnetized to provide first and second regions of oppositely polarized magnetization with the first and second regions being oppositely polarized as between the tines. The first region of magnetization encompasses the free ends of the tines and joins the second region of magnetization at a location along the tines between the mounting end and the free end.

Each of the tines is further configured to have two distinct resonant frequencies of vibration with a first resonant frequency for motions of the tines in a drive plane of motion lying coplanar with both tines and with a second resonant frequency for motions of the tines transverse to the drive plane. The second resonant frequency is greater than the first, and generally is separated from the first frequency in Hz by about 4/3 times the desired output response frequency of the sensor.

The tines are driven in resonant vibration in the first drive plane of motion by electromagnetic drive means mounted inside the shell around the element to permit electromagnetic interaction with the tines substantially in the drive plane.

According to one embodiment of the invention the drive means are situated near the free ends of the tines and electromagnetic sensing means are provided and situated near the junction of the first and second regions of magnetization to sense the frequency of vibration of the tines in the drive plane of motion and to sense the motion of the tines occurring transverse to the drive plane, and to produce a resonance sense signal and angular rotation sense signal respectively. The resonance sense signal may be utilized to control the electromagnetic drive means and thereby consistently maintain the vibration of the tines at the first resonant frequency in the drive plane of motion. The angular rotation sense signal may be conditioned to provide a D.C. voltage proportional to the rate of rotation of the vibrating element about its longitudinal axis.

According to another embodiment of the invention the electromagnetic drive means are situated near the junction of the first and second regions of magnetization of the tines and capacitive sensing means are provided and situated about the tines near the free ends thereof. The capacitive sense elements similarly produce resonance and angular rate signals which may be utilized in the same manner as described with reference to the electromagnetic sense means.

According to another aspect of the invention the vibrating element includes stress relief notches located on opposite sides thereof to isolate the drive vibration node of the element from the base member.

According to yet another aspect of the invention the electromagnetic drive and sense means each include a non-ferromagnetic core member having at least one pair of inwardly projecting posts each with a coil member disposed therearound. The outer perimeter of the core members may be shaped to fit inside the shell and may be mounted therein using a set of washer-spacers.

According to still another aspect of the invention the capacitive sensing means includes three pairs of capacitor plates, a first pair positioned on opposite sides of the free end of the element to sense motions of the tines in the drive plane, a second pair of plates being positioned on opposite sides of the element and each adjacent a different one of the tines and a third pair of the plates being positioned on opposite sides of the element and each adjacent a different one of the tines so that each tine has at least one capacitive plate adjacent thereto on each side coplanar with the drive plane. Each pair of the plates is electrically connected to a positive potential through a high value of resistance and the tines of the vibrating element are grounded. The first pair of plates is also electrically connected through a capacitance to first a differential amplifier referenced to ground so that motions of the tines in the drive plane cause the first amplifier to produce a resonance signal. The second and third pair of plates are each additionally connected to different inputs of a second differentail amplifier so that differential motions of the tines transverse to the drive plane cause the second amplifier to produce a sense signal, and so that common mode motions transverse to the drive plane do not cause the second amplifier to produce a sense signal.

Thus, these and other aspects of the invention combine to provide an angular rate sensor of improved sensitivity and bandwidth, and of improved accuracy and reliability, as will be demonstrated in the ensuring specification and drawing.

DETAILED DESCRIPTION OF THE INVENTION

Electromagnetic Sense Embodiment

Figure 1:
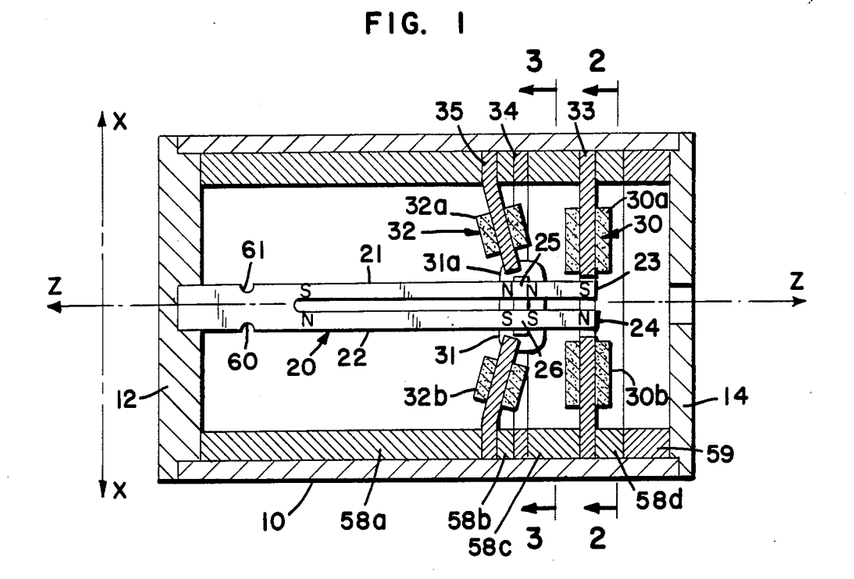
FIG. 1 is a longitudinal cross sectional view of an angular rate sensor according to the present invention.
Figure 2:
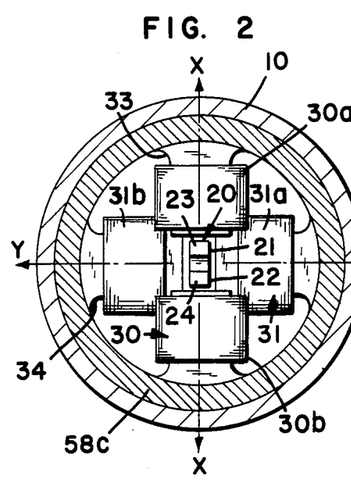
FIG. 2 is a cross sectional end view taken along the lines 2—2 of FIG. 1 of an angular rate sensor according to the present invention.
Figure 3:
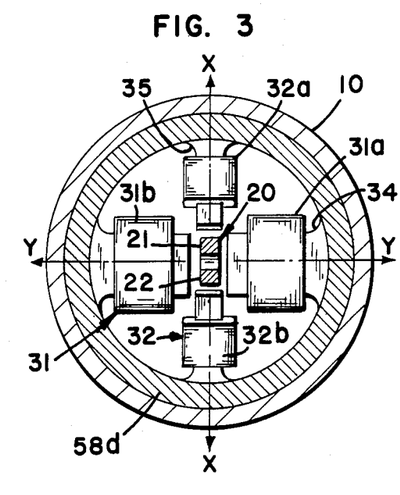
FIG. 3 is a cross sectional end view taken along the lines 3—3 of FIG. 1 of an angular rate sensor according to the present invention.

There are disclosed herein two principal embodiments, one "capacitive" and one "electromagnetic," of a vibrating rod angular rate sensor according to the present invention. Referring first to FIGS. 1, 2 and 3, there is shown generally the wholly electromagnetic embodiment of the angular rate sensor according to the present invention. An elongate metal cylinder or shell 10 is provided, within which vibrating element 20 is supported by base supported 12, which additionally functions as a cap for one end of shell 10. Element 20 is mounted to support 12 so that the central longitudinal axis of element 20 lies substantially coincidental with the longitudinal central axis of cylinder 10. Preferably, element 20 and base 12 are rigidly joined by interference fitting so as to be substantially immovable with respect to one another.

As shown in the drawing, the longitudinal axis of element 20 is denoted the Z axis, which in FIG. 1 lies in the plane of the paper and in FIGS. 2 and 3 normal to the paper, at the intersection of the X and Y axes. In FIG. 1 the X axis also lies in the plane of the paper, perpendicular to the Z axis, with the Y axis being normal to the XZ plane. In FIGS. 2 and 3, the X and Y axes lie in the plane of the paper.

Vibrating element 20 is generally "forked" and includes two rods or "tines" 21 and 22 each having a rectangular cross section. By a process that will be described below in more detail, tines 21 and 22 are each magnetized to have two regions of high magnetic field. With regard to tine 21, a first region of magnetization is provided to extend from a first north pole at a point 25 in mid-element to a south pole at free end 23. A second region of magnetization extends from a second north pole abutting the first north pole at point 25, toward a second south pole near the mounting end of the element. Similarly, tine 22 also includes two regions of magnetization abutting mid-element at a point 26, only the regions of tine 22 have their poles oriented in opposition to those of tine 21. Thus, for each element there is provided two areas of high external or surface magnetic flux, in particular at ends 23 and 24 and generally about points 25 and 26.

Supported inside shell 10 and positioned about element 20 are three coil assemblies generally denoted 30, 31 and 32. As may be seen better with reference to FIGS. 2 and 3, each of these assemblies includes a pair of coils, denoted as a and b, positioned on opposite sides of element 20, with each coil being wound about the opposing posts of the respective core elements generally designated 33, 34 and 35, for the respective assemblies 30, 31 and 32.

Coil assembly 30 performs as the "drive coil," and has its poles oriented parallel to the plane (k.e., the XZ plane) of tines 21 and 22. Coil assembly 31 acts as the "sense coil," and is oriented with its poles (and corresponding gap) parallel to the plane of the tines and as close to the free ends of the elements 23 and 24 as practical, given electromagnetic coupling restrictions as between coil assembly 30 and 31, which coupling must be accommodated and compensated for in order to assure accurate angular rate detection. Coil assembly 32 acts as the "resonance coil," and has its poles oriented in the plane of the tines, as the drive coils, such that some level of coupling exists between the resonance coil and the drive coil. As may be seen with reference to FIG. 1, the core 35 for resonance coil 32 is slightly angled, so that coils 32 are as close as physically possible to the high magnetic flux fields about points 25 and 26.

Figure 6:
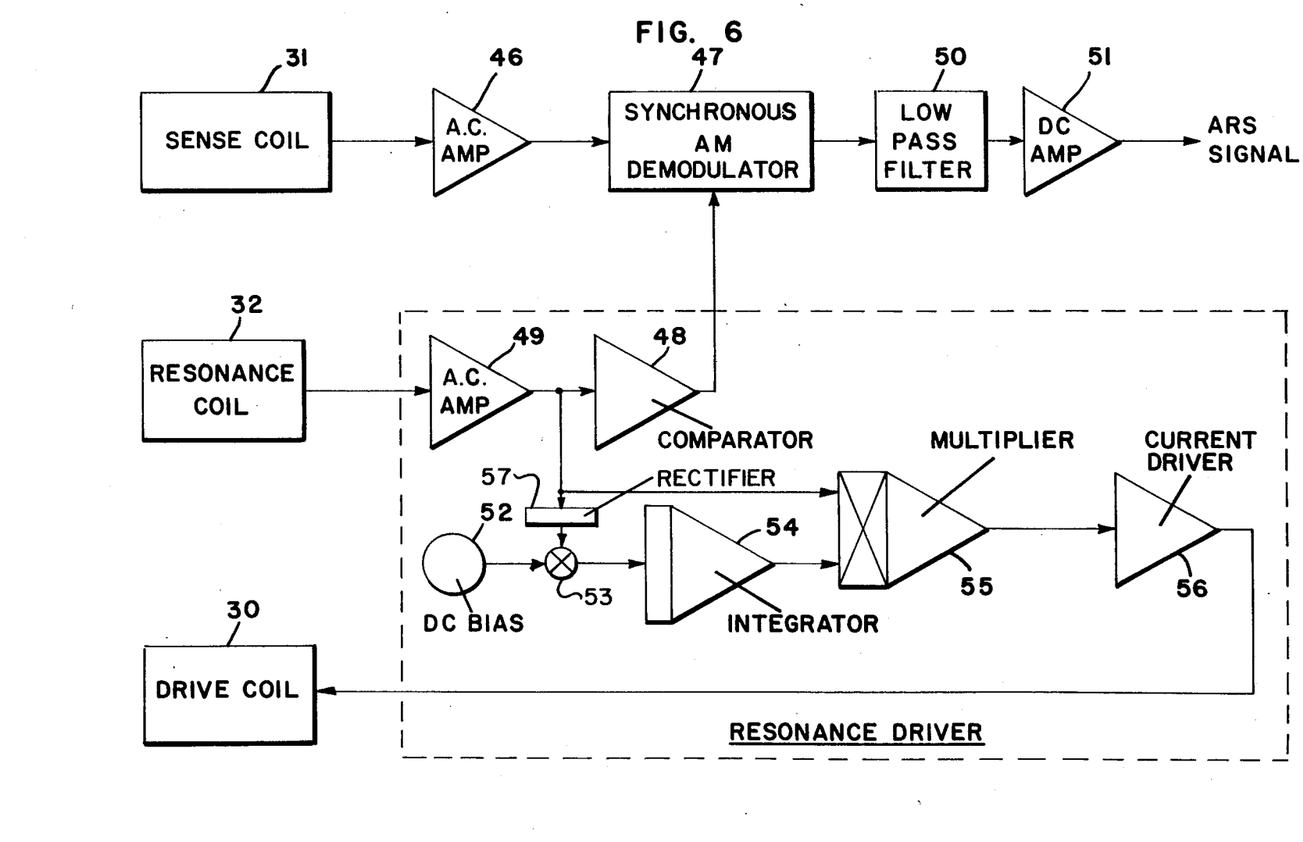
FIG. 6 is a block diagram of the drive control and sensing circuits of an electromagnetic angular rate sensor according to the present invention.

Referring to FIG. 6 there is shown in block diagrammatic form the electrical drive control and sensing circuits preferably connected to the sense, drive and resonance coils to maintain resonant vibration of the tines in the drive plane and to demodulate and condition sense motion signals produced by the sense coil, to produce the angular rate signal. An A.C. amplifier 46 is provided to amplify the output of sense coil 31 for application to a synchronous AM demodulator 47. A phase reference signal is supplied to demodulator 47 from a comparator 48, which receives an amplifier resonance coil signal from amplifier 49, which receives an input from the resonance coil 32. The output of demodulator 47 is passed through low pass filter 50, which removes components at that signal above a predetermined threshold, and then D.C. amplifier in an amplifier 51, to produce the angular rate sense (ARS) signal.

Rectifier 57, D.C. bias 52, summing junction 53, integrator 54, and multiplier 55 form an automatic gain control for the system. Current driver 56 and the automatic gain control form the resonant drive circuit which receives the amplified resonant coil signal and adjusts the drive current to drive coil 30 to maintain the vibrating element in vibration at a frequency substantially at its resonant frequency. Of course, alternate analog or digital circuits may be employed to accomplish these functions, as those skilled in the art are aware. For example, another resonance drive circuit which may be utilized in conjunction with the apparatus disclosed in FIG. 1 to control the drive resonance of element 20 is disclosed in my co-pending patent application "Circuit for Tracking and Maintaining Drive of Actuator/Mass at Resonance" (as amended), Ser. No. 280,500 filed July 6, 1981.

In operation, tines 21 and 22 are maintained in complementary motion, (i.e., the tines move toward and away from each other simultaneously), at their resonant frequency by the application of an alternating drive current from drive 56 to drive coils 30a&b, which are wound oppositely for differentially to produce simultaneously opposite magnetic fields in response to the drive current. It has been found that since the magnetic fields produced by drive coils 30a&b are directly proportional to the input current, high peak current should be avoided, no matter how short, or else demagnetization of tines 21 and 22 may occur, which in turn will degrade the operating characteristics of the sensor. To this end it has been found preferable to use a square wave drive current to as great of an extent possible given the counteracting inductance of the drive coils. Also to this end, drive coils 30a&b are located at the free ends 23 and 24 of tines 21 and 22 to provide the maximum mechanical advantage obtainable in driving the tines, which provides for a reduction in the required drive current.

In order to maintain tines 21 and 22 at their natural resonant frequency of vibration in the drive plane XZ, the application of drive current to coils 30a&b must be frequency adjusted or modulated by feedback from resonance coil 32 and the resonant driver circuitry as shown in FIG. 6. Coils 32 sense frequency and the amplitude of vibration in the XZ or drive plane. However, if desired, resonance coils 32a&b may be omitted, and the drive resonance may be detected using the back electromotive force (EMF) of the drive coils 30&b. Or, since the resonance coils 32a&b detect low flux levels and do not produce any significant interference for the sense coils, it is possible to combine the resonance coils in the sense coil assembly 31.

In operation, electrical currents are induced in resonance coils 32a&b of amplitude in proportion to the amplitude of vibration of tines 21 and 22 and of frequency in synchronism with the frequency of vibration of tines 21 and 22. The current induced in resonance coils 32a&b, which are wound differentialy as in the case of coils 30, is then, as shown in FIG. 6, utilized to control the input currents to drive coils 30a&b, whereby tines 21 and 22 may be maintained in vibration at their resonant frequency, which results in a predetermined amplitude of vibration.

With tines 21 and 22 each vibrating at their resonant frequency, the symmetry of element 20 causes the base support and in particular the Z axis of symmetry of that base support 12 to be the node of the system vibration, such that no significant vibrational energies are conducted out of the sensor into either the remaining structure of the sensor or to the external environment. Moreover, tines 21 and 22 are preferably spaced at a distance less than one-tenth the wave-length of sonic radiation generated at their resonant frequency. In this manner, acoustic energy developed by the tines is effectively cancelled. Thus, element 20 is configured in order to substantially eliminate the propagation of vibrational or acoustical energy out of the system, and thus substantially eliminate reflection of those energies back into the system, and thereby reduce angular rate sensing errors which may be introduced thereby. However, because an ideal interface between element 20 and base support 12 is not practical over wide ranges of temperature due to the necessity of utilizing different materials for each, discontinuities at that interface caused by imperfections therein can result in the reflection of vibrational noise back into the sensor. Therefore, stress relief notches 60 and 61 are provided on opposite sides of element 20 in order to isolate, as much as possible, the operational stresses associated with the vibratory nodes of tines 21 and 22 from the mounting interface of element 20 with base support 12. In practical effect, relief notches 60 and 61 move the vibratory node of element 20 toward the free end of the element, and thus relieve stress on the mounting interface. This feature of element 20 has been found to substantially reduce reflections due to imperfections in the interface.

As mentioned above, coils 31a&b serve as the sense coils for sensing motions of tines 21 and 22 transverse to the drive plane, and are oriented with their gap parallel to the plane of the elements and as close to the free ends 23 and 24 of the elements as practical. Although this location along tines 21 and 22 exhibits less movement (i.e. amplitude) in the plane transverse to the drive plane than at the free ends of the tines in response to applied angular rates, this loss of sensitivity can be compensated for by providing more coil turns in coils 31a&b, a greater element magnetic field about points 25 and 26, or a smaller gap between the coils.

In the absence of angular rates of turn and assuming proper alignment of sense coils 31a&b, any flux passing through coils 31a&b induces currents in each of those coils of the same frequency and amplitudes. Because coils 31a&b are wound differentially, as described above with respect to coils 30 and 32, there is produced a substantially net "null" angular rate output signal. However, when the sensor is rotated about the sensor's Z or sense axis, tines 21 and 22 are set in vibratory motion transverse to the drive plane by Coriolis forces. Due to the complementary motion of the tines 21 and 22 in the drive plane, the tines move toward and away opposite coils (31a&b) in synchronism. Given the opposing magnetic polarity of each tine, it may be seen then that the magnetic flux through coils 31a&b induces additive currents in a first direction as the tines move toward their outermost displaced position from the Y axis, and in a second direction when the tines move toward their innermost position with respect to the Y axis, and thus, double the output signal of a single tine system is produced. The vibratory sense motion of each of tines 21 and 22 has a frequency equal to that of the drive frequency plus and minus the angular frequency of rate of rotation. Thus, the signal produced by the sense coils 31a&b are roughly sinusoids of frequency substantially equal to that of the drive resonance frequency, and of an amplitude proportional to the magnitude of displacement of tines 21 and 22 out of the drive plane.

In addition to the increased sensitivity that the differential sensing scheme as described above produces, the arrangement also serves to reject any externally introduced linear vibrations by reason of the following. As both tines 21 and 22 have a common base support and nodal axis of vibration, externally applied linear vibrations produce a common mode motion of the elements, provided that the elements have substantially identical resonant sense motion frequencies. Given substantially equal and opposite element magnetic fields, as produced around points 25 and 26 of tines 21 and 22 respectively, sensing signals produced by such common mode motions of the elements substantially cancel each other using the above-described differential sensing technique.

Figures 4, 5, 7:
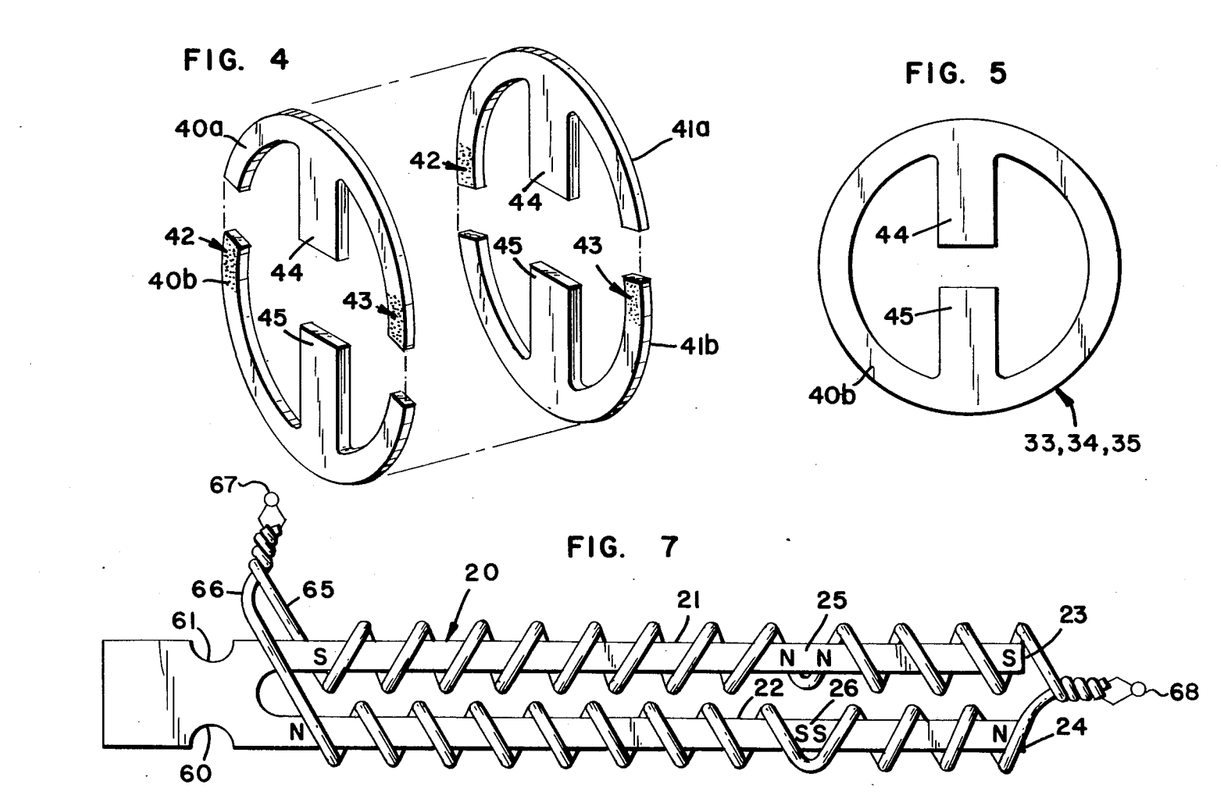
FIG. 4 is an exploded perspective view of an electromagnetic core assembly according to the present invention.
FIG. 5 is a plan view of the preferred core structure of the present invention.
FIG. 7 is an illustration of the technique for magnetizing the vibrating element of the present invention.

With regard to the construction of the coil assemblies, core elements 33, 34 and 35 are preferably ring-shaped with two opposing inward posts 44 and 45 as generally shown in FIG. 5. Preferably, the core elements are of a one-piece construction from an nonferromagnetic or low permeability material which, of course, preferably has a relatively constant permeability over temperature, and a low or small coefficient of contraction or expansion. The non-ferromagnetic qualities of the core elements substantially eliminate fluxgate magnetometer effects caused by the Earth's magnetic field, which effect is prevalent in highly permeable core elements. The use of low permeability core elements has been found to substantially reduce these effects, and thereby reduce sensing errors attributable thereto. In addition, it has been found that the cross-coupling between the coils is also reduced in this manner, whereby another source of measurement error is avoided.

As may be seen with reference to FIG. 4, each of cores 33, 34 and 35 may, in the alternative, be comprised of two pairs of soft iron laminates 40a&b and 41a&b in which corresponding pairs are abutted together and layered one on top of the other in opposite orientation to provide staggered joints as designated generally by numerals 42 and 43 and the two opposing inward posts 44 and 45. The result is a core with sufficient magnetic coupling around the outside to maintain the outer ring in an essentially magnetically neutral condition (thereby minimizing the radiation of magnetic fields to the other coils through the cylinder 10 etc . . . ), when the coils on each post are oppositely energized to provide a high opposing magnetic polarity between the posts. Also, the soft iron core provides high flux levels over an extended temperature range. However, ferrite core material can, if desired, be utilized for more moderate temperature variations. Because as explained above, soft iron core elements of this type suscept the coil assembly to magnetometic fluxgate effects in the windings, they are less preferable than lowpermeability core elements, especially in the case of the wholly-electromagnetic embodiment of the present invention. However, in the case of the capacitive sense embodiment to be described below, iron core elements may be used for the drive coils, as there is no danger of coupling noise from this source into the sense elements.

It has been observed that because the flux passing through the coils is a square law function of the gap between the tines and the coils, certain nonlinearities, which are a function of the ratio of the change in gap between the coils and the tines divided by the normal gap magnitude, may be introduced. Fortunately, this ratio remains quite small for moderate angular rates, but at high ranges of angular rates, may result in significant nonlinearities in the sense amplitude. to this end, the present invention contemplates that the core pole pieces could be shaped to extend the linearity, or an unusually wide gap could be utilized. The same approach can also be used to linearize the drive coil operation, although generally speaking nonlinearities in the drive function do not present a problem. In addition, since in the preferred embodiment of the present invention coils 31a&b are of a copper wire, as for the other coils, which significantly changes resistance with temperature, it is preferable that a high impedance amplifier be used in the sensing circuit as described above, such that the copper resistance becomes insignificant.

Coil assemblies 30, 31 and 32 are mounted in cylinder 10 via a set of cylindrical copper spacer elements 58a, 58b, 58c and 59d, which are held in place by another copper spacer 54, and a copper cap member 14 soldered in place, which has a hole in its center through which wires may be fed. The assembly and alignment of the above-noted components in cylinder 10 will be discussed in more detail below.

Referring now to FIG. 7, the properties of vibrating element 20 and the technique for magnetizing that element will be described. Preferably, element 20 is machined from an iron-chrome-colbalt magnet material known as Arnokrome, which may be obtained from The Arnold Engineering Company, subsidiary, Magnetics & Electronic, Inc. 300 West Street, Margengo, Ill. 60152. This material has been found to possess the requisite physical qualities so as to be machinable to produce element 20 to the above-noted specifications of symmetry, to hold its dimensions over wide ranges of temperature, and to possess the requisite magnetic properties (i.e. magnetic uniformity) which are required to maintain the above-described regions of magnetization on tines 21 and 22 over a wide range of temperatures and for an extended time period. The physical properties of this material are also sufficient to allow element 20 to be machined to produce the requisite qualities of mechanical Q and drive and sense motion resonant frequencies, as will be described hereinbelow in detail. Moreover, Arnoldchrom has been found to have sufficient yield strength to withstand the extremely high G forces developed in gunfired environments.

The means for magnetizing element 20 comprises a pair of wires 65 and 66, which are coiled around the respective tines 21 and 22 with a reversal of each wire at the respective points 25 and 26. Thus, by the introduction of appropriate currents through wires 65 and 66 via terminals 67 and 68, the regions of magnetization described above with respect to FIG. 1 are produced on tines 21 and 22. Magnetizing tines 21 and 22 in this manner not only produce high levels of surface magnetic flux at points 25 and 26, which acts to boost the levels of magnetic flux flowing through sense coils 31a&b, but in addition has been found to aid in maintaining high field strengths at the free ends 23 and 24 of the respective tines 21 and 22. This, in combination with the position of the drive coils in the case of the embodiment of FIG. 1, allows smaller drive currents to be used to drive coils 30a&b in order to maintain tines 21 and 22 in complementary resonant vibration. The resultant reduction in the drive current requirement has the obvious advantage of reducing the likehood of demagnetization of the tines (which can introduce bias errors in the sensor) but in addition results in the additional benefit of reducing cross coupling of magnetic fields from drive coils 31a&b to sense coils 31a&b, which has been found to be a particularly troublesome source of sensing error for wholly electromagnetic sensors. Relatedly, shell 10 is preferably made of copper in order to reduce magnetic coupling between the elements through the housing. However, other nonmagnetic materials can be utilized, such as a beryllium copper alloy. In any case, the most important material selection factor being the maintenance of a substantially constant magnetic coupling between the various coils over temperature and magnetic bias, in order that coupling effects may be compensated out in a predictable manner.

CAPACITVE SENSE EMBODIMENT

Figures 8, 9, 10, 11:
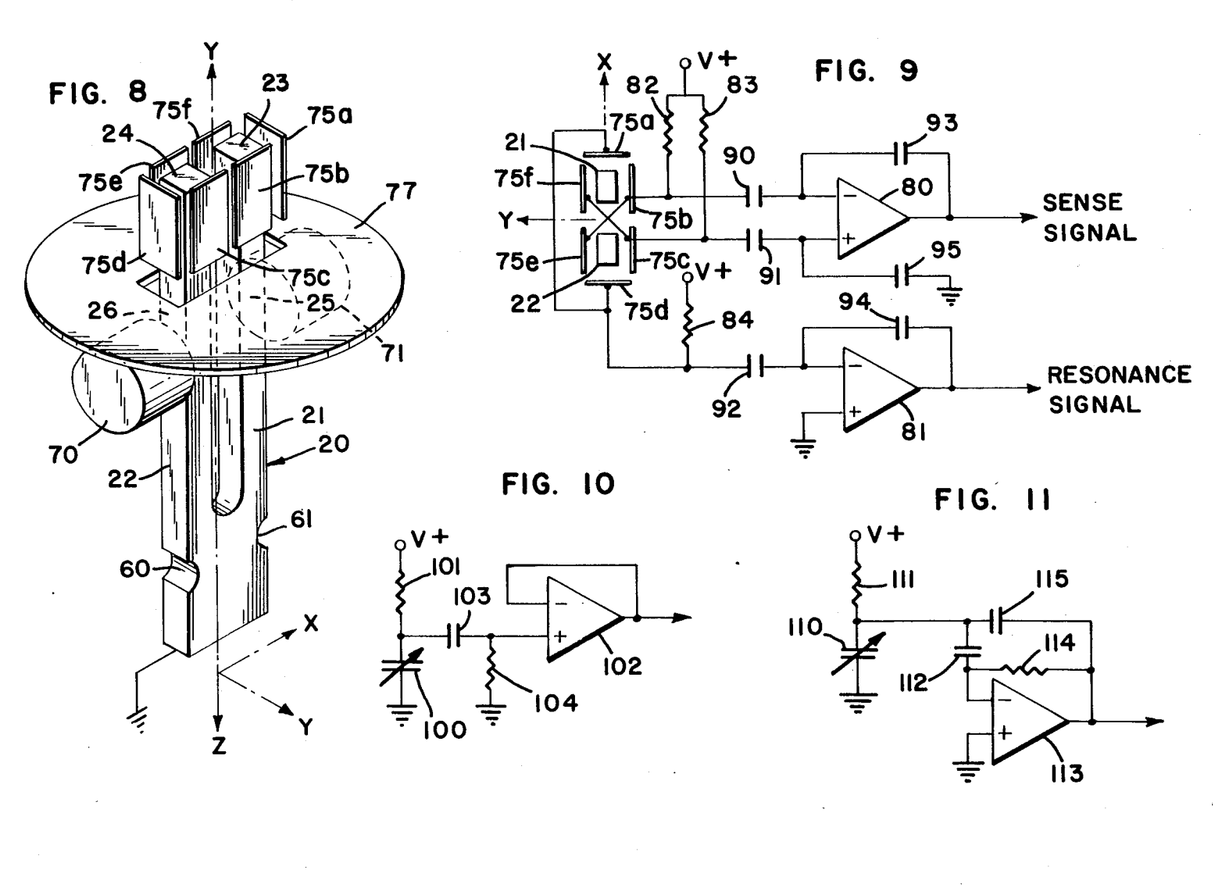
FIG. 8 is a diagrammatic perspective view of an angular rate sensor using capacitive sensing according to the present invention.
FIG. 9 is an electrical schematic diagram of the electrical circuit preferably employed with the sensor of FIG. 8.
FIGS. 10 and 11 are alternate embodiments of capacitive sensing circuits according to the present invention.

Referring now to FIG. 8, there is shown in diagrammatic form an alternate embodiment of an angular rate sensor according to the present invention. The particular mounting structure for the components shown in FIG. 8 have been omitted for the sake of clarity and brevity in the drawing, but it will be understood that the same mounting techniques as described with reference to FIGS. 1, 2 and 3 may be used to implement the sensor of FIG. 8. The orientation of the X, Y and Z axes denoted in FIG. 8 corresponds to the orientation of the corresponding axes of FIGS. 1, 2 and 3, with respect to the vibrating element 22.

The principal differences between the sensor of FIG. 8 and that of FIGS. 1, 2 and 3 are two. First, drive coils 70 and 71 are provided about points 25 and 26 of element 20, which is magnetized in the same manner as described with reference to FIG. 7. This is in contrast with the embodiment of FIG. 1 in which the drive coils 30a&b were positioned about the free ends 23 and 24 of element 20. The second principal difference is the utilization of capacitive sense elements 75a–f to sense the resonance of tines 21 and 22 in the drive plane and to sense the motion of tines 21 and 22 transverse to the drive plane, which functions were performed by coils 31a&b and 32a&b in the embodiment of FIG. 1. An additional difference between the embodiments of FIG.

1 and FIG. 8 is the provision of a conductive low permeability shield date 77 disposed between drive coils 70 and 71 and capacitive sense plates 75a-f. Shield plate 77 is disposed in the XY plane and mounted in a similar fashion to that discussed with respect to core pieces 33-35. While many low permeability materials would be sufficient for this purpose, in the present embodiment copper is utilized.

The capacitive sensing plates 75a-f are electrically connected as shown in FIG. 9 to high impedance differential amplifiers 80 and 81. Capacitive plates 75b and 75e are electrically connected and biased to a positive potential V+ through a high resistance 82 (on the order of 10E12 ohms). Capacitive plates 75c and 75f are similarly connected and biased through another high impedance resistance 83 to V+. Capacitive plates 75a and 75d are likewise connected and also biased through a large value of resistance 84 to a positive potential V+. Capacitive plates 75b and 75e are also connected through a capacitance 90 to the inverting input of amplifier 80. Plates 75c and 75f are similarly connected through a capacitance 91 to the noninverting input of amplifier 80. Plates 75a and 75c are similarly connected through a capacitance 92 to the inverting input of amplifier 81. The output of differential amplifier 80 is connected through a feedback capacitance 93 to the inverting input thereof. The output of differential amplifier 81 is likewise connected through a feedback capacitance 94 to the inverting input thereof. The noninverting input of amplifier 80 is connected through a capacitance 95 to ground. The noninverting input of amplifier 81 is connected directly to ground. Element 20, and thus tines 21 and 22, are also connected to the same ground as the electrical components of FIG. 9.

Thus, as described above, the combination of tines 21 and 22 and capacitive plates 75a-f form three separate parallel plate capacitive elements. As may be readily appreciated, the area of each of the plates of these capacitors is constant, and thus the capacitance of each capacitor varies with the distance between tines 21 and 22 and the plates coacting therewith. Furthermore, given the high impedance biasing of the charge on each of the capacitors via the potential V+ and resistors 82, 83 and 84, it will be readily understood to those skilled in the art that the voltage on each capacitor is proportional to the distance between the tines and the corresponding plates. Therefore, the complementary motion of tines 21 and 22 in the drive plane produces a periodic increase and decrease in the voltage on plates 75a&d, the period being in synchronism with the resonant frequency of the tines, which in turn is applied to amplifier 81 through capacitor 92. As may be readily realized, the output of amplifier 81, the resonance signal, varies in frequency according to the frequency of vibrations of tines 21 and 22. The resonance signal may then be used, as described above with respect to the embodiment of FIG. 1, to demodulate the sense signal and to control the application of drive currents to coils 70 and 71.

Capacitive plate pairs 75b&e, and 75c&f operate to generate voltages in a similar fashion to pair 75a&d in response to angular rotation. As described above with reference to the embodiment of FIG. 1, in the presence of angular rotation about the sense axis (Z) of element 20, tines 21 and 22 oscillate transverse to the drive plane at a frequency substantially in synchrony with that of the drive resonance. As tines 21 and 22 move in complementary opposing motion in the drive plane, a similar complementary opposing motion occurs transverse to the drive plane. Thus, for example, as tine 21 moves toward plates 75a and 75f, tine 22 moves toward plates 75d and 75c. Thus, in the presence of an applied angular rate of rotation, the voltages on pairs 75b&e and 75c&f rise and fall in a complementary fashion, with an amplitude proportional tot he degree of displacement of tines 21 and 22 transverse from the drive plane, to produce a differential input to amplifier 80 and a sense signal output which has a mangitude proportional to the magnitude of the angular rate. This sense signal may be demodulated as described with reference to FIGS. 1 and 6.

Like the magnetic sensing arrangement described with reference to FIG. 1, the capacitive sensing arrangement of the embodiment of FIGS. 8 and 9 is differential in nature. Therefore, this arrangement also rejects common mode linear vibrations, as was the case for the electromagnetic sensing of the embodiment of FIG. 1. However, the capacitive sense embodiment does not require a relatively long warm-up period like the electromagnetic sense embodiment in which there are significant start up transients or changes in the balance of the sensor's magnetic fields, which in turn distort rate measurements. Thus, the capacitive sense embodiment is preferable where short warm up is required. In addition, the capacitive sense embodiment substantially reduces sensing errors attributable to gradual demagnetization of the tines and fluxgate magnetometer effects.

Alternate circuits for sensing variable capacitance as produced by the capacitive sensing arrangement of FIGS. 8 and 9, are shown in FIGS. 10 and 11. In FIG. 10, there is shown a variable capacitance source 100, such as the capacitive sense arrangement discussed above. Capacitor 100 is biased through a large value of resistance 101 to a source of positive potential V+. A capacitor 103 connects capacitance 100 to the noninverting input of operational amplifier 102 and through a resistance 104 to ground. Amplifier 102 has its output connected to its inverting input to form a follower. In FIG. 11, there is shown another circuit for detecting variable capacitance. Variable capacitance 110 is biased through a high value of resistance 111 to a positive potential V+. Capacitance 110 is connected through a capacitor 112 to the inverting input of an amplifier 113. Feedback from the output of amplifier 113 to the noninverting input thereof is provided by a resistance 114 and capacitance 115, and the noninverting input of amplifier 113 is grounded. It will be readily understood to those skilled in the art that both the circuits of FIGS. 10 and 11 may be implemented as is or with various minor modifications to accomplish the sensing described above with reference to FIG. 9.

Although from the foregoing it is apparent that the sensing of the drive resonance or the sensing of rate of turn may be accomplished either by electromagnetic or by capacitive means, it should be appreciated that in order to preserve the phase relationship between these sense signals which are needed for demodulating the rate sense signal, that both resonance sensing and rate sensing should be accomplished by the same means, i.e., either both electromagnetic or both capacitive.

With regard to the capacitive sensing arrangement described above, there are several variations which may be implemented without departing from the spirit and scope of the invention. For example, it is contemplated that a voltage may be applied to element 20, instead of grounding the same, and that other corresponding changes be made to the sensing circuitry as shown in FIG. 9. In addition, it is contemplated that the drive sense plates, i.e., plates 75a and 75d may be eliminated and that sense information generated by those plates be derived by plates 75b, c, e and f as may be readily accomplished with additional circuitry.

VIBRATORY CHARACTERISTICS OF THE VIBRATING ELEMENT

Thus far there has been described above certain aspects of both embodiments of the angular rate sensor according to the present invention. More particularly, there has been described the basic operating principles of the invention, the general configuration and preferred mounting of vibrating element 20, and the particular details of the alternate means for driving and sensing the motion of element 20. There will now be described, with reference to FIGS. 12-15, certain aspects of element 20 relating to the preferred vibratory characteristics thereof.

Figure 12:
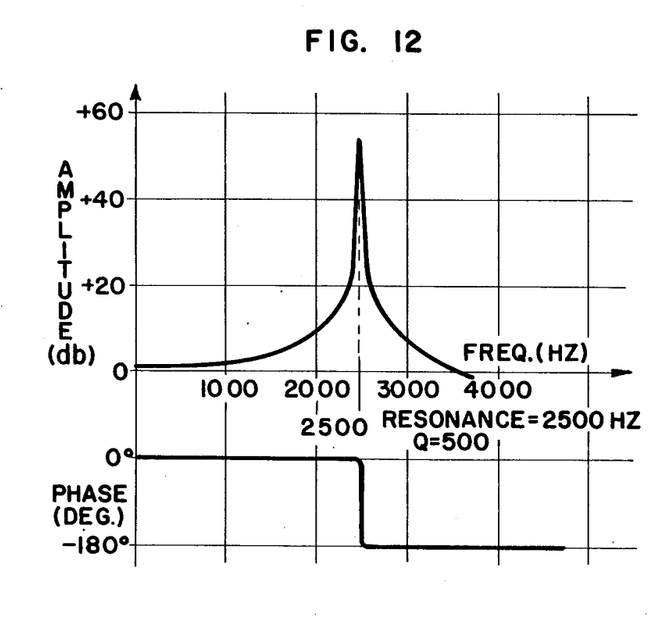
FIG. 12 is a plot of response characteristics for a typical vibrating element.

A typical response curve or transfer function for a high "Q" resonant element as are typically employed in vibrating element sensors is shown in FIG. 12, which is a graph of amplitude versus frequency and the phase angle response for a mechanical element (e.g. a tine) having a Q equal to 500, and a resonant frequency of 2500 Hz. For a dual vibrating tine element as described above, it should be understood that each tine has its own independent response curve.

As well known to those skilled in the art, a vibrating tine of the type disclosed herein is characterized not only by a response curve for vibrations in the drive plane, but in addition by a response curve of vibrations transverse to the drive plane, i.e., sense motions, which are those motions detected for the purpose of rate determination. Hereinafter, the former and latter types of response curves will be referred to as the "drive response" and the "sense response".

The relationship between the drive response and the sense response is a very important aspect of all vibrating element sensors, and is critical to their usefulness and practicality. As will be seen from the following, the criticality of this important aspect has not been well understood heretofore, and thus prior art vibrating element devices of similar concept to that of the present invention have not been particularly commercially successful.

As described above, rotation of a vibrating element sensor causes the transfer of energy from the drive plane into sense motion transverse thereto, with those sense motions having a frequency substantially equal to that of the vibrations in the drive plane. Thus, the predominant teaching in the prior art has leaned toward the provision of an isotropic vibrating element, that is an element in which the resonant frequency of sense motion is equal to the resonant frequency of motion in the drive plane, thereby maximizing the amplitude of sense motion in response to angular rates of turn. In a system of this type then, the drive and sense response curves should preferably be identical. While this arrangement has appeared attractive to many skilled in the art, it has inherent limitations which, as demonstrated below, make it impractical and substantially unworkable.

The "Q" for a practical system of the herein described variety i.e. electromagnetic drive, is in the vicinity of 2500, and in the vicinity of 500 for piezoelectric systems, based on the materials typically used for each of these different types of vibrating element sensors. The following discussion will assume a worst case Q value of 500 (it should be noted that higher Q's magnify the difficulties to be described) and a resonant frequency of 2500 Hz (based on typical vibration noise spectra) for both drive and sense motions. Given these assumptions, tuning of an isotropic element system must be made to accuracies of much less than 1 Hz to match the operating responses and phase of the drive and sense response curves for adequate sensing operation.

Figure 13:
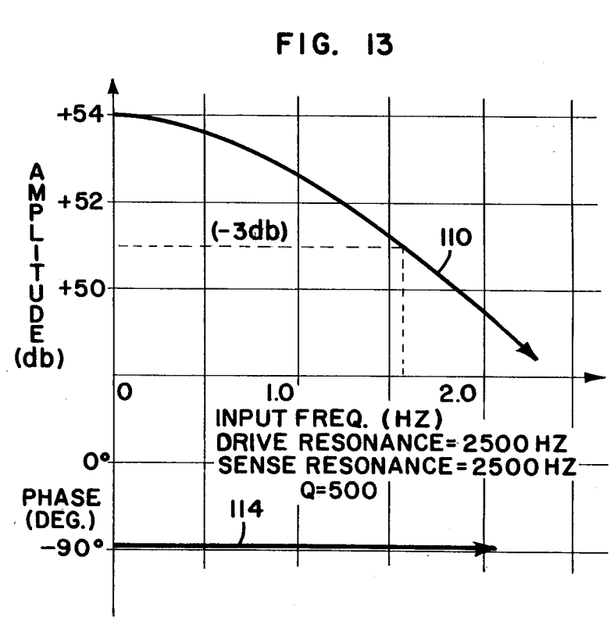
FIG. 13 is a plot of a system response of a vibrating element wherein the natural resonant drive frequency.
Figure 14:
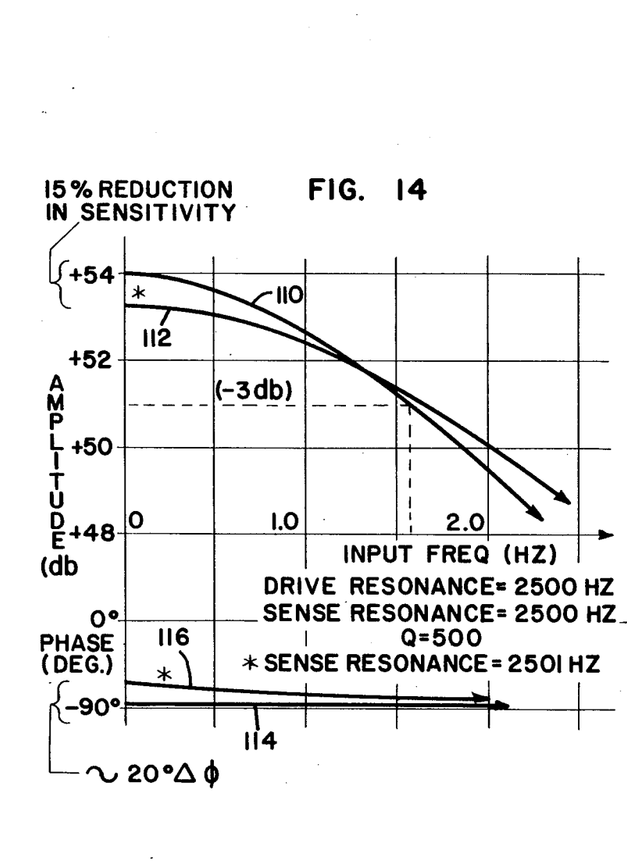
FIG. 14 is a plot illustrating the affect of differences between drive resonant frequency and the sense resonant frequency on amplitude output and phase measurements.

More particularly, in terms of dynamic response, the energy transferred from the drive plane into sense motion is divided into two equal parts and is superimposed on sense motion at the drive frequency plus and minus the frequency of input exitation, i.e., the rate of rotation. This is a heterodyne response producing upper and lower sidebands. Given the above frequencies and Q factor, curves 110 and 114 of FIG. 13 show that the resulting system response (demodulated) to input frequency (Hz) is lagging by 90 degrees and has a bandwidth of 1.6 Hz at −3db. The fact that the D.C. reponse contains an almost 90 degree phase shift indicates that the output frequency of the sense motion contains a strong component of angular displacement, which is obviously undesirable. Such a response is not usable in stabilization and navigation systems which require relative wide response bandwidths and scale factor stability.

Furthermore, because the match in frequencies between the drive motion and the sense motion will have a finite error through age, temperature and other factors, and because there is such a strong inflection resonance for high Q systems, there will be strong variations in the response envelope and phase. This is demonstrated in the demodulated system response comparison of FIG. 14 by showing the effect of a one (1) Hz change (0.04%), from 2500 to 2501, in the resonance frequency of the sense resonance. As demonstrated by amplitude response curve 112, and by phase response curve 116, there is a 15% loss of gain and a phase shift of about 20 degrees in the phase response curve from the ideally matched system. Accordingly, relatively minor discrepancies between the drive resonance and sense resonance frequencies introduce significant errors into this system, which make the concept unusable as a practical matter. In addition, matching the resonant frequencies of drive and sense motion results in a relatively slow die out of sense motions after an angular rate has been removed, due to the tendency of the drive motion to maintain the sense motion during fadeout. Thus, the response rate bandwidth is limited.

Figure 15:
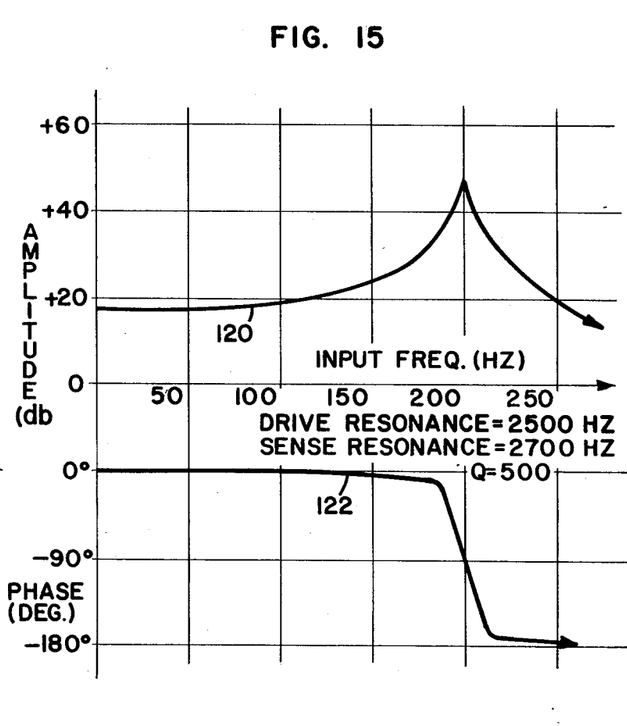
FIG. 15 is a plot of the response curve of the vibrating element sensor according to the present invention.

The present invention alleviates the aforementioned undesirable characteristics of prior art sensors by configuring the vibrating element to have a sense resonance of higher frequency than the drive resonance. In particular, it has been found that the sense and drive resonant frequencies should be separated in Hz about 4/3 times the desired output response bandwidth. Referring to FIG. 15, there is shown the sensor response (demodulated) characteristics of the vibrating element sensor of the present invention in which the drive resonance occurs at 2500 Hz and the sense resonance at 2700 Hz, with a Q equal to 500. As may be seen from curves 120 and 122 in FIG. 15, the sensor has a bandwidth reasonably usable to over 150 Hz. Moreover, due to the frequency separation between the drive and sense motions, the sensivity to shifts in resonant frequencies as between those motions is greatly reduced also. Accordingly, the vibrating element sensor according to the present invention is reliable over much wider spans of temperature and age, and has a much wider usable bandwidth, and thus is useful in a much wider range of applications.

COIL AND CAPACITIVE PLATES ASSEMBLY AND ALIGNMENT

The assembly into cylinder 10 and alignment of the drive, sense and resonance elements with respect to the vibratng element is accomplished as follows. With the base of element 20 immoveably mounted within cylinder 10 via base support 12, the drive, sense and resonance elements (either the electromagnetic or capacitive) are inserted from the other end of cylinder 10 and visually aligned. Tines 21 and 22 are then driven to vibrate in the drive plane at the resonant frequency of sense motion via the electromagnetic drive coils (30a & b for the embodiment of FIG. 1 or coils 70 and 71 for the embodiment of FIG. 8). The drive coils are then rotated or aligned to null sense motions, which may be monitored via the sense signal output. Thus, the drive coils are aligned to produce a minimum of sense motion drive.

Next, tines 21 and 22 are driven at the drive plane resonant frequency, and the sense elements are aligned. In the case of the embodiment of FIG. 1 the sense coils 31 are rotated or aligned to the point of minimum crosstalk between the drive coils and the sense coils. In the case of the capacitive sense embodiment of FIG. 8 the sense plates are aligned to null the sense output signal. The alignment of the resonance elements in either embodiment is not critical and may be done visually.

SENSOR HOUSING

Figure 16:
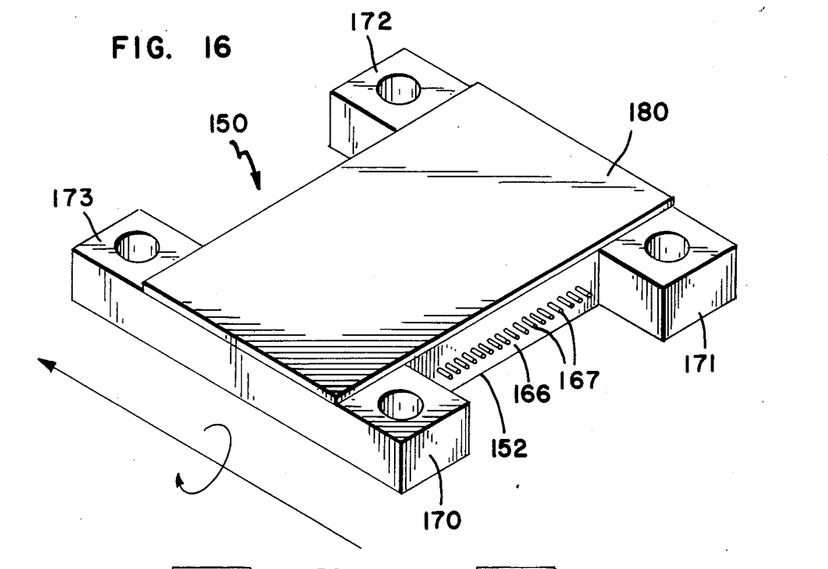
FIG. 16 is a perspective view of the housing of electrical and mechanical components of the angular rate sensor according to the present invention.
Figure 17:
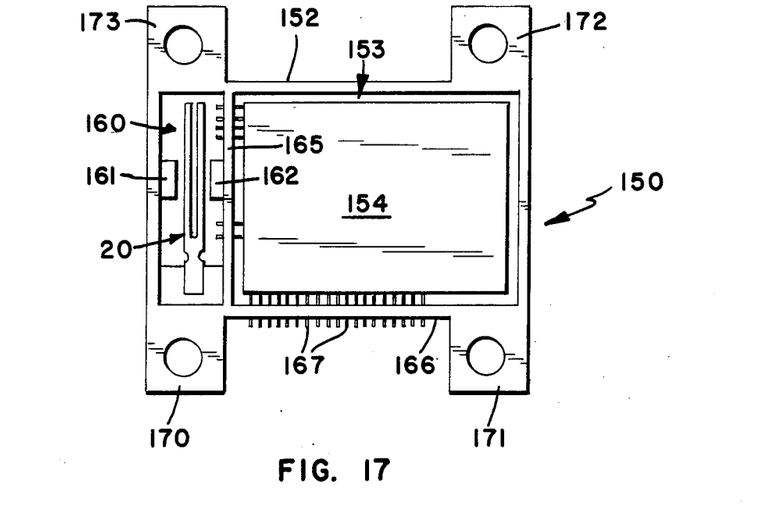
FIG. 17 is a plan view of the housing of FIG. 16 with the top removed.

Referring now to FIGS. 16 and 17 there is shown the preferred housing for the angular right sensor according to the present invention for use in high G-force environments. Housing 150 comprises machined rectangular case 152 which includes a first compartment 153 within which a circuit board or hybrid circuit 154 may be mounted. A second compartment 160 is also provided, within which vibrating element 20 and associated driving and sensing elements, for example elements 161 and 162, may be mounted.

Circuit board 154 is electrically connected through terminations in a wall 165, between compartments 153 and 160, to the various electrical components of the angular rate sensor apparatus in compartment 160. On circuit board 154 there may be mounted the various electrical components necessary to the operation of sensor 20, and the outputs and inputs to these circuits may be made through wall 166 via leads 167.

Case 152 includes four mounting tabs 170-173 each of which includes an aperture through which casing 152 may be bolted in place in the device in which it is utilized. A lid 180 is provided to cover compartments 153 and 160, and is braised or welded in place, to provide a substantially hermetrically sealed environment.

While there has been described hereinabove certain preferred embodiments of an angular rate sensor according to the present invention, shall be understood that many modifications and variations of the described invention may be made without departing from the spirit in scope of the invention as defined in the claims appended hereto.

What is claimed is:

1. An angular rate sensor comprising:
    (a) a vibrating element having a base end and a pair of elongate tines extending therefrom to a free end of said element, said base end forming a nodal axis of vibrational energy for said tines, said element being fabricated to permit vibration of said tines in a drive plane of motion at a drive resonant frequency and to permit vibration of said tines transverse to said drive plane motion at a sense resonant frequency;
    (b) each of tines being magnetized to have two separate magnetic systems each including a north and a south pole to provide two regions of opposite and relatively high external magnetic field, a first one of said regions situated near the free ends of each of said tines and a second one of said regions situated between said first region and said base end, the correspondingly situated regions of said tines being of opposite magnetic field;
    (c) electromagnetic drive means interacting with one correspondingly situated pair of said regions for vibrating said tines in opposition relative to one another in the drive plane of motion at said drive resonant frequency;
    (d) sensing means for producing an output signal in response to opposing sense motions of said tines occurring transverse to the drive plane, said output being representative of the rate of turn of said vibrating element about a central longitudinal axis thereof.

2. An angular rate sensor according to claim 1 wherein said element is fabricated such that said sense resonant frequency is substantially greater than said drive resonant frequency.

3. An angular rate sensor according to claim 1 wherein said element is fabricated such that said sense resonant frequency is greater than said drive resonant frequency by an amount approximately 4/3 times the desired output response bandwidth of the sensor.

4. An angular rate sensor according to claim 1 wherein said base end has a mounting end and wherein said vibrating element is notched on opposite sides of said base end to isolate vibrational stresses generated in the tines of said element from the mounting end of said base end on the other side of said notches.

5. The angular rate sensor according to claim 1 wherein said tines are magnetized so that each one includes two magnetic poles of the same polarity substantially abutting one another along the length of the tine for producing said second regions of relatively high external magnetic field.

6. An angular rate sensor according to claim 5 wherein said element is fabricated from material having homogeneous magnetic properties.

7. An angular rate sensor according to claim 6 wherein said element is fabricated from an iron-chrome-cobolt alloy.

8. An angular rate sensor according to claim 5 wherein said drive means and said sensing means each include wire coils for producing and sensing magnetic fields respectively, to move said tines and sense the movement of said tines by interaction with said first regions of magnetic field and said second regions of magnetic field respectively.

9. An angular rate sensor according to claim 8 wherein said coils each include a low permeability core so that fluxgate magnetometer effects are avoided.

10. An angular rate sensor according to claim 5 wherein said sensing means includes a plurality of capacitive plates situated about the free end of said element to sense variations in the capacitance between said plates and said tines caused by variation in the distance between the tines and the plates in a direction transverse to said drive plane, and wherein said drive means is electromagnetic and is positioned about said element between said free end and said base end to interact with said second regions of magnetic field.

11. An angular rate sensor comprising:
(a) a vibrating element having a base end and a pair of elongate tines extending therefrom to a free end of said element, said base end forming a nodal axis of vibrational energy for said tines, said element being fabricated to permit vibration of said tines in a drive plane of motion at a drive resonant frequency and to permit vibration of said tines transverse to said drive plane motion at a sense resonant frequency;
(b) said tines magnetized so that each one includes first and second longitudinally extending regions of oppositely polarized magnetization, each of said regions including longitudinally spaced apart north and south poles forming the opposite poles of a magnet, and so that said first and second regions are oppositely polarized as between corresponding regions of said tines, said first regions including a pole encompassing the free ends of said tines and substantilly abutting said second region at a location along said tines between said base end and said free end whereby a relatively high external magnetic field is produced;
(c) electromagnetic drive means selectively energizable for vibrating said tines in opposition relative to one another in the drive plane of motion at said drive resonant frequency, said drive means being situated near the free ends of said tines to interact with one pole of each of said first regions of magnetization;
(d) electromagnetic sensing means situated near said relatively high external magnetic fields for producing an output current signal in response to opposing sense motions of said tines occurring transverse to the drive plane, said output current being representative of the rate of turn of said vibrating element along a central longitudinal axis thereof.

12. An angular rate sensor according to claim 11 wherein said vibrating element is notched on opposite sides of said base end to isolate vibrational stress in said element from said base.

13. An angular rate sensor according to claim 11 wherein said element is fabricated such that said sense resonant frequency is substantially greater than said drive resonant frequency.

14. An angular rate sensor according to claim 13 wherein said element is fabricated such that said sense resonant frequency is greater than said drive resonant frequency by an amount approximately 4/3 times the desired output response bandwidth of the sensor.

15. An angular rate sensor according to claim 11 wherein said electromagnetic drive and sensing means each include wire coils, and wherein said coils include low permeability cores to avoid fluxgate magnetometer effects.

16. An angular rate sensor comprising:
(a) a pair of vibrating elements each having first and second ends;
(b) means for mounting said pair of elements for physical vibration in direct opposition to one another about a nodal axis, each of said elements being mounted at the first ends thereof;
(c) each of said elements being magnetized to have two regions of opposite and relatively high external magnetic field, a first one of said regions situated near the second ends of each of said elements and a second other one of said regions situated between said one region and said first ends, the correspondingly situated regions of said elements being of opposite magnetic field.
(d) electromagnetic drive means for interacting with said first regions of magnetization situated near the second ends of said elements for causing said sensor elements to vibrate in a first plane of opposing motion relative to one another about said nodal axis; and
(e) electromagnetic sensing means situated to sense the magnetic fields of said second regions of magnetization of said elements for producing a sensed output signal in response to a change by said sensor element from its first plane of vibrating motion.

17. An angular rate sensor according to claim 16 wherein said elements are further mounted inside an elongate housing constructed of non- or low ferromagnetic material, and wherein said drive and sensing means are positioned between said housing and said elements, so that electromagnetic coupling between said drive and sensing means remains substantially independent of variations in the magnetic properties of said housing.

18. An angular rate sensor comprising:
(a) a forked vibrating element having a first mounting end and a pair of elongate tines extending therefrom to a free end of said element, said mounting end forming a nodal axis of vibrational energy for said tines;
(b) means for magnetizing each of said tines to provide first and second longitudinally extending regions of oppositely polarized magnetization, each of said regions including longitudinally spaced apart north and south poles forming opposite poles of a magnet, said first and second regions being oppositely polarized as between said tines, said first region including a pole encompassing the free end of said tines and substantially abutting said second region at a location along said tines between said mounting end and said free end; whereby a relatively high external magnetic field is produced;
(c) electromagnetic drive means situated about the free end of said element for vibrating said tines in opposition relative to one another in a drive plane of motion by interaction with the poles said first regions of magnetization encompassing the free end of said tines; and
(d) means situated near said relatively high external magnetic fields for sensing the magnetic flux thereabout to produce a sense output signal in response to a change by said tines from their drive plane of motion.

19. An angular rate sensor comprising:
(a) a pair of elongate elements each having first and second ends;
(b) means for mounting said pair of elements at said first ends in substantial parallelism for physical vibration in direct opposition to one another about a nodal axis;
(c) each of said elements being magnetized to include first and second longitudinally extending regions of oppositely polarized magnetization, each of said regions including longitudinally spaced apart north and south poles forming the opposite poles of a magnet, said first and second regions of a tine substantially abutting one another to provide a relatively high external magnetic field situated between said ends, said external magnetic fields being of opposite polarity as between said elements;

(d) electromagnetic drive means interacting with the forces of said relatively high external magnetic fields of said elements for energizing said sensor elements to vibrate at a resonant frequency in a first plane of opposing motion relative to one another about said nodal axis; and (e) capacitive sensing means situated to sense the movement of said second ends of said elements for producing a sensed output signal in response to a change by said sensor element from its first plane of vibrating motion.

20. An angular rate sensor according to claim 19 wherein said capacitive sensing means includes two pairs of plates, one plate of each pair positioned adjacent different ones of said elements on the same sides thereof in a plane parallel to said first plane, and the other plate of each pair positioned on the other sides of said elements in a plane parallel to said first plane and adjacent the opposite one of said element that said one plate is adjacent, each pair of plates electrically connected together to first and second inputs of a differential sensing means for producing said sensed output signal.

21. An angular rate sensor according to claim 20 wherein further capacitive sensing means are provided to sense the movement of said elements in said first plane of opposing motion and produce a representative signal, and wherein said drive means includes means responsive to said representative signal for maintaining vibration at a selected frequency.

22. An angular rate sensor comprising:
(a) a vibrating element having a base and a pair of elongate tines extending therefrom to a free end of said element, said base forming a nodal axis of vibrational energy for said tines, said base including a mounting end, said element being fabricated to permit vibration of said tines in a drive plane of motion at a drive resonant frequency and to permit vibration of said tines transverse to said drive plane motion at a sense resonant frequency;

(b) drive means selectively energizable for vibrating said tines in opposition relative to one another in the drive plane of motion at said drive resonant frequency;

(c) sensing means for producing an output signal in response to opposing sense motions of said tines occurring transverse to the drive plane, said output being representative of the rate of turn of said vibrating element along a central longitudinal axis thereof;

(d) said sense resonant frequency being greater than said drive resonant frequency by an amount approximately 4/3 times the desired output response bandwidth of the sensor.

23. An angular rate sensor comprising:
(a) a vibrating element of unitary construction formed from a single block of material having a base and a pair of elongate tines extending therefrom to a free end of said element, said base forming a nodal axis of vibrational energy for said tines, said base including a mounting end, said element being fabricated to permit vibration of said tines in a drive plane of motion at a drive resonant frequency and to permit vibration of said tines transverse to said drive plane motion at a sense resonant frequency;

(b) drive means selectively energizable for vibrating said tines in opposition relative to one another in the drive plane of motion at said drive resonant frequency;

(c) sensing means for producing an output signal in response to opposing sense motions of said tines occurring transverse to the drive plane, said output being representative of the rate of turn of said vibrating element along a central longitudinal axis thereof;

(d) the base of said element including stress relief notches cut from said base on opposite sides thereof between said mounting end and where said tines extend from said base for isolating vibrational stresses in said element from said mounting end of said base, said notches positioned and sized to cause the vibratory node of the element to be longitudinally displaced toward the free end of said element relative to the position of the vibratory node of the element without the notches so that vibrational noise is isolated from the mouting end of said base.

* * * * *

UNITED STATES PATENT AND TRADEMARK OFFICE
CERTIFICATE OF CORRECTION

PATENT NO. : 4,674,331

DATED : June 23, 1987

INVENTOR(S) : William S. Watson

It is certified that error appears in the above-identified patent and that said Letters Patent is hereby corrected as shown below:

Column 2, line 42 "accomodated" should be --accommodated--.

Column 2, line 49 "with" should be --With--.

Column 4, line 29 "ensuring" should be --ensuing--.

Column 4, line 62, after "frequency" add the following --is equal to the natural resonant sense frequency--.

Column 5, line 62 "(k.e.," should be --(i.e.,--.

Column 6, line 20, "amplifier" should be --amplified--.

Column 6, line 25, "amplifier", first occurrence, to read -- amplified --.

Column 9, line 30 "to" should be --To--.

Column 11, line 2 "date" should be --plate--.

Signed and Sealed this

First Day of December, 1987

*Attest:*

DONALD J. QUIGG

*Attesting Officer*  *Commissioner of Patents and Trademarks*

UNITED STATES PATENT AND TRADEMARK OFFICE
CERTIFICATE OF CORRECTION

PATENT NO. : 4,674,331

DATED : June 23, 1987

INVENTOR(S) : William S. Watson

It is certified that error appears in the above-identified patent and that said Letters Patent is hereby corrected as shown below:

Column 12, line 6 "tot he" should be --to the--.

Column 13, line 64 "variety i.e." should be --variety, i.e.,--.

Column 14, line 19 "reponse" should be --response--.

Column 17, line 25 "substantilly" should be --substantially--.